Patented Feb. 26, 1929.

1,703,616

UNITED STATES PATENT OFFICE.

GUSTAV EGLOFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

DESULPHURIZATION OF MINERAL OILS.

No Drawing.   Application filed March 17, 1926.   Serial No. 95,499.

This invention relates to improvements in the desulphurization of mineral oils, and refers more particularly to the removal of objectionable sulphur compounds present in hydrocarbon oils of varying gravities, and more specifically the invention contemplates the treatment of cracked distillates.

The presence of objectionable sulphur compounds even in relatively low percentages in hydrocarbon oils, and particularly cracked overhead products, is one of the difficult problems now confronting the oil industry. Various attempts have been made and much experimental and research work carried on with the idea in mind of removing these objectionable sulphur compounds in an economical, practical and satisfactory manner.

The present invention contemplates the distillation of the oil in the presence of a drying oil such as fish oil or chinawood oil, which reacts with the sulphur compounds, and with which drying oil these sulphur compounds react chemically and become a part thereof.

As an illustrative example of one method of utilizing the present invention, I may take specifically a pressure distillate oil produced as the condensed overhead product of a pressure distillation. To this oil I add say from 3 to 5% more or less of the drying oil, depending upon the refractiveness of the oil and the amount of objectionable sulphur compounds therein. This mixture may be heated to that temperature at which rapid combination between the drying oil and the sulphur containing oil takes place, say between 500 and 600° F. more or less, depending upon the type of oil treated under superatmospheric pressure.

It is preferable although not absolutely essential, to maintain the mixture during distillation or digestion, under a superatmospheric pressure which may range from 50 to 200 pounds more or less, and in some cases it works very well at atmospheric pressure or under a vacuum, and the present invention contemplates that the process shall not be limited to any particular pressure. The distillation or digestion may continue from say 10 to 24 hours as will be apparent to those skilled in the art, depending upon various conditions. The overhead product formed during the distillation, will be found to be substantially freed of the refractory and objectionable sulphur compounds, said sulphur compounds remaining in the residue which will comprise the heavy ends of the oil, the sulphur compounds and the drying oil.

I claim as my invention:

1. A process for treating cracked distillates to remove sulphur compounds therefrom comprising commingling with the cracked distillates a quantity of a drying oil, subjecting the resulting mixture to a temperature sufficiently high to cause a rapid combination between the drying oil and the sulphur compounds, subjecting the mixture to distillation under a super-atmospheric pressure and recovering the overhead product formed during such distillation.

2. A process for treating cracked distillates to remove sulphur compounds therefrom comprising commingling with the cracked distillates a quantity of a drying oil, subjecting the resulting mixture to a temperature sufficiently high to cause a rapid combination between the drying oil and the sulphur compounds, subjecting the mixture to distillation, and recovering the overhead product formed during such distillation.

GUSTAV EGLOFF.